Jan. 27, 1942.   F. O. COLE   2,270,994
LIQUID FUEL BURNING APPARATUS
Filed July 16, 1938   3 Sheets-Sheet 1
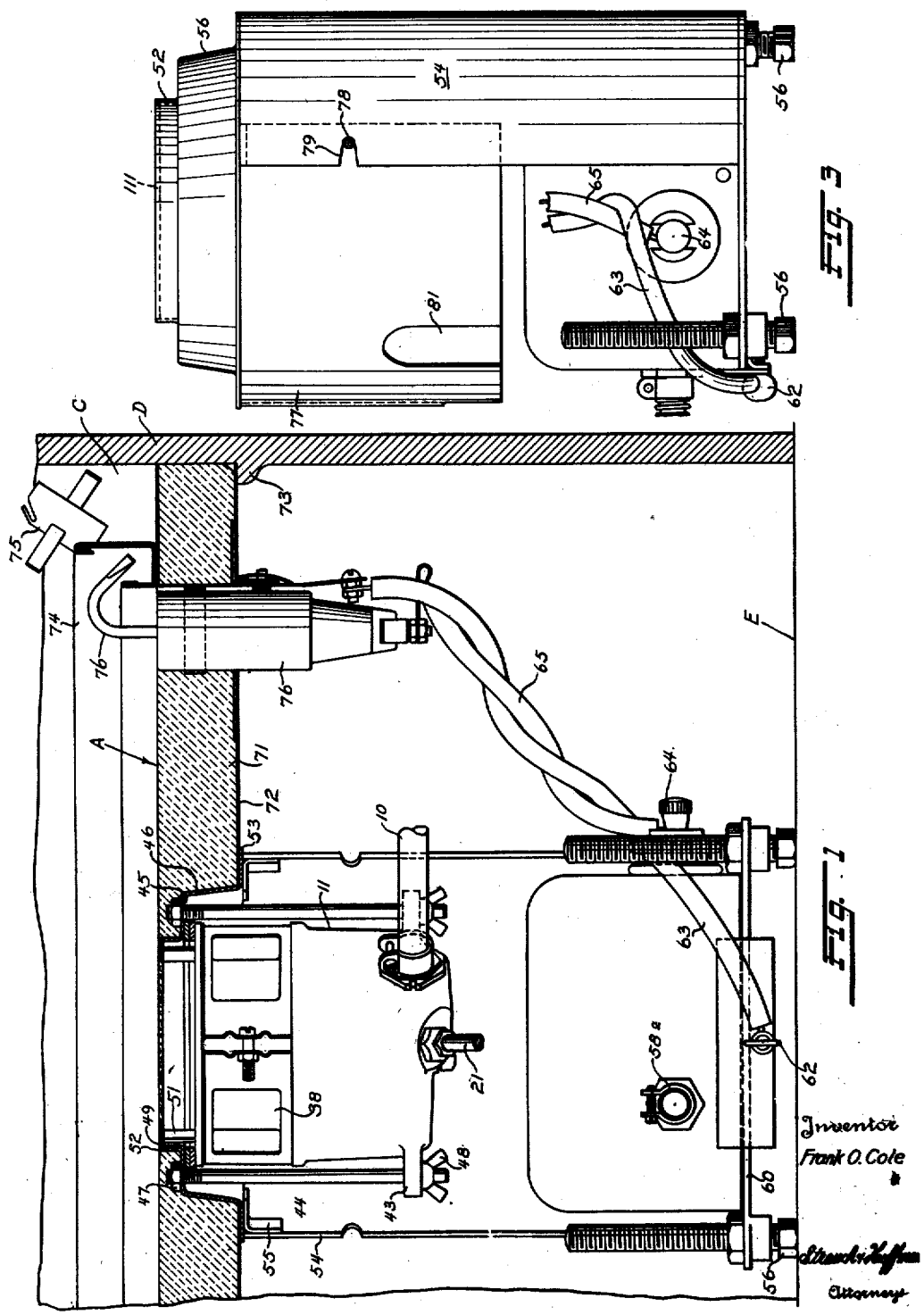
Inventor
Frank O. Cole

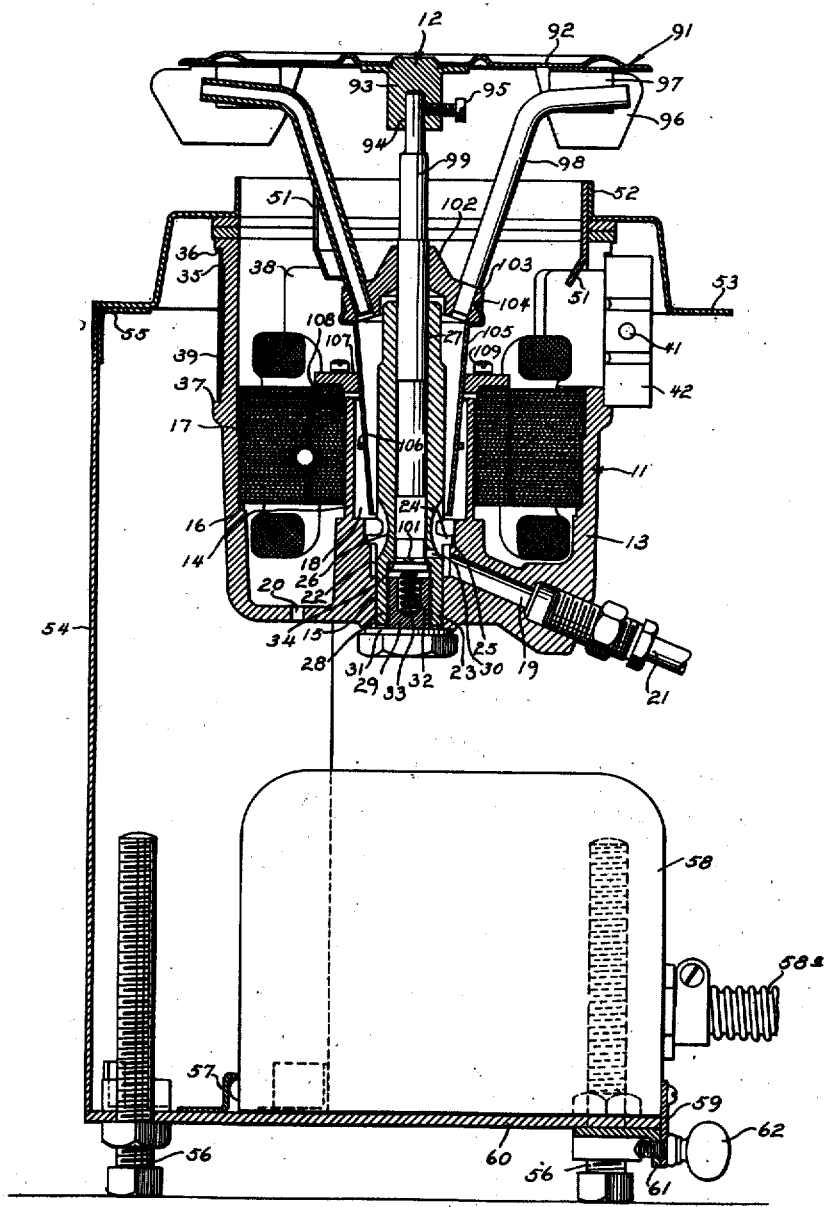

Jan. 27, 1942.   F. O. COLE   2,270,994
LIQUID FUEL BURNING APPARATUS
Filed July 16, 1938   3 Sheets-Sheet 3
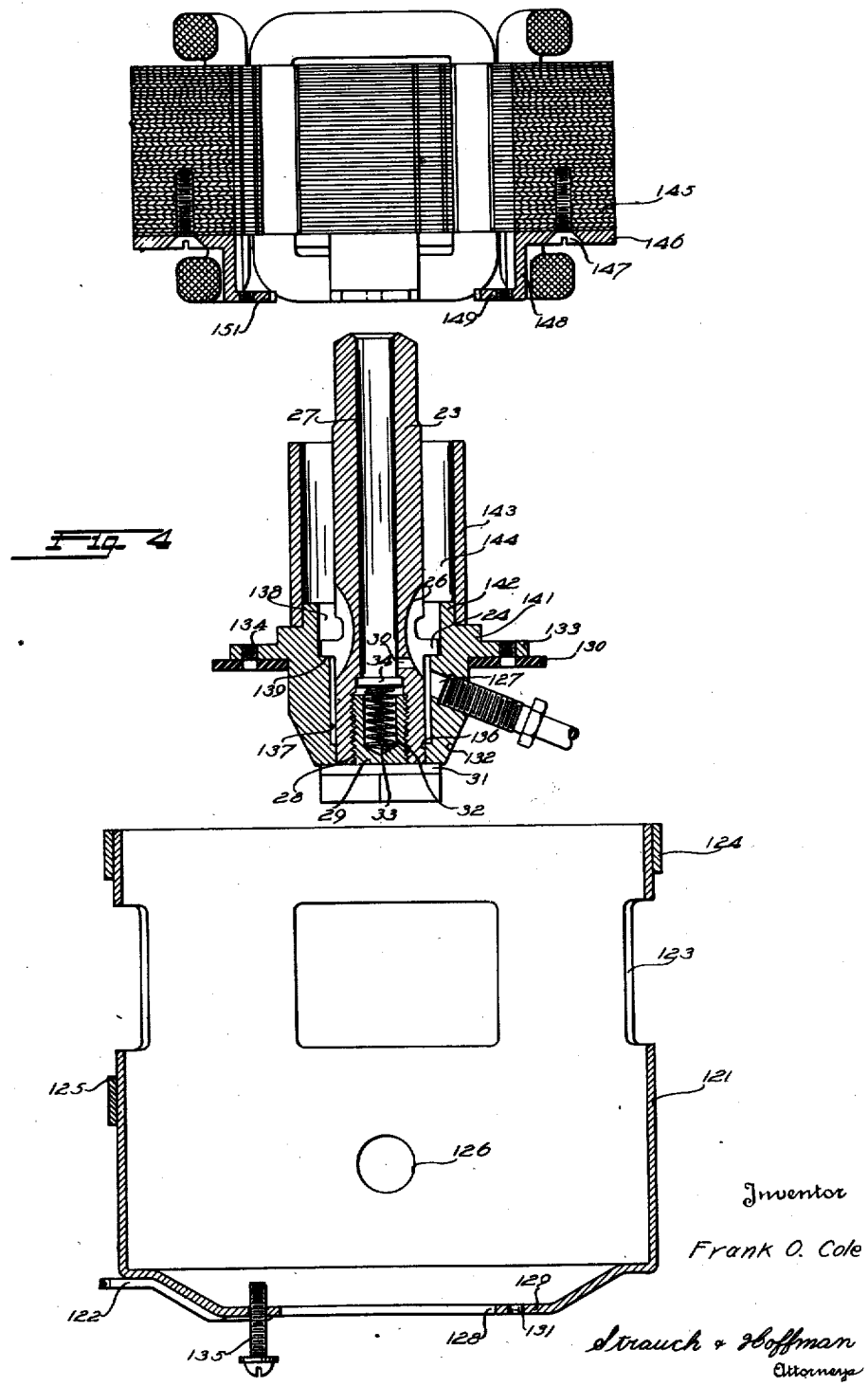

UNITED STATES PATENT OFFICE 2,270,994

LIQUID FUEL BURNING APPARATUS

Frank O. Cole, Detroit, Mich., assignor to The Timken-Detroit Axle Company, Detroit, Mich., a corporation of Ohio Application July 16, 1938, Serial No. 219,637

9 Claims. (Cl. 103—4)

This invention relates to novel apparatus for burning liquid fuel in accordance with what has come to be known as the "wall flame principle," and more specifically to novel apparatus for feeding and distributing the fuel to be consumed.

In the field of liquid fuel combustion involving the use of oil burners, prior burners have proven satisfactory in domestic use when employed in houses or establishments of relatively large size requiring the use of large burners and furnaces. However, such burners and furnaces are too large for small homes. They are not economical for such use and are difficult to hold to the small fuel consumption required for heating a small house economically. In the case of pressure oil burners, for instance, it is difficult to secure satisfactory operation at rates of less than 1.35 gallons per hour, which is far in excess of the amount of fuel normally required for a small house. While the present wall flame burners offer a wide operating range of from 5 to 50 pounds of oil per hour, they are expensive because of their wide range, and for that reason have not been acceptable for the small homes because the advantage of the higher range is of no value. As a result of this situation, the use of oil heat in small homes has been restricted. While small plants have been devised, in most cases they have been over-supplied with the result that operating periods are extremely short, distribution of heat in the home is uneven and intermittent with rapid fluctuations in the temperature, and operating costs are high.

In meeting this problem of small home heating, the present invention has for its major object the provision of a novel type burner, designed especially for small heating plants requiring from 5 to 10 pounds of oil per hour; this burner being more economical and of greater efficiency over a smaller operating range than the larger burners hitherto available.

To bring maintenance costs to a minimum and to secure maximum efficiency of the device under all conditions of operation, it is a further object of the present invention to provide one single moving unit of novel structure which performs a number of functions including that of the oil pump, the oil distributor, the rotor of the electric motor, the motor shaft, and the fan. These elements, all in the one unit, are in a circle of relatively small diameter so that the centrifugal force developed therein is small and very light parts can be employed. As a consequence, the power consumption is very small and it is possible to use a relatively small motor for both the purposes of pumping and distributing the fuel, and pumping and distributing the air with which the fuel is mixed for combustion.

It is still a further object of this invention to provide a rotary oil burner in which the problems of assembly and disassembly are relatively simple, and the moving parts thereof can be readily assembled and installed as a unit.

A further object of the present invention is to provide a novel rotating assembly for a rotary oil burner wherein the friction therein is reduced to a minimum, and the design thereof is such that satisfactory operation thereof is assured under all conditions.

Still a further object of the present invention is to provide a novel assembly for a rotary oil burner wherein the fuel passing to the burner is utilized to lubricate the moving part.

A further object of the present invention is to provide a rotary fuel burner which permits maximum ease in assembly, a unitary casing being provided to house the stator of the motor, the oil supply and the fuel delivery means, the casing also comprising means to insure proper ventilation of the motor and an adequate supply of air for combustion of the fuel.

A further object of this invention is to provide a novel oil pumping and distributing mechanism in combination with a rotary oil burner wherein only a minimum level of oil is necessary to be maintained in connection with the combined distributor and pump, the undesirable discharge of oil and leakage of oil to the remaining parts of the mechanism and the surging characteristic of prior burners of this type being thereby eliminated.

A further object of this invention involves the provision of novel supporting means for a burner unit of relatively light construction yet with means to effectively dampen and absorb the vibrations incident to operation of the unit.

Still a further object of this invention is to provide a novel method of feeding oil to a distributor including the maintenance of a minimum level of oil to eliminate the possibility of surging.

A further object of this invention is the provision of a novel rotary oil burner with a stator and rotor assembly of a construction that is cheaper to manufacture than prior assemblies and more easily serviced.

Still a further object of this invention is to provide a novel rotary oil burner with a motor assembly wherein vibration is minimized through the provision of a "floating" support and better ventilation is secured than in prior assemblies.

Further objects will become apparent as the specification proceeds in connection with the appended claims and the annexed drawings wherein:

Figure 1 is a vertical elevation in partial section of a part of the bottom portion of an oil burning furnace or similar unit embodying one form of the present invention with the rotor of the unit removed.

Figure 2 is a vertical section of the novel combined motor, fuel lifting device, distributor head, transformer and support.

Figure 3 is a side elevation of the unit shown in Figure 2 with the rotor removed and with the air shield in position.

Figure 4 is an exploded view of a modification of the stator and rotor assembly of Figures 1 to 3, inclusive.

With continued reference to the drawings wherein like reference characters have been employed to designate like parts throughout the several views thereof, a complete burner A with the exception of the rotor is shown mounted centrally in a combustion chamber C of a furnace D having a floor generally shown at E.

Referring to Figure 2, the oil supply mechanism proper of the burner comprises a stationary element or motor casing 11 and a rotating element or distributor 12. Motor casing 11 comprises an outer casing 13 formed generally as a cup with an upstanding central wall or boss 14 and an aperture 15 concentric with boss 14. Casing 13 and annular wall 14 define an annular chamber having a shoulder 16 therein arranged to receive a stator 17 of an electric motor, the connections to the motor being made through a conduit 18 as shown in Figure 1. In the modification, casing 13 is preferably cast of relatively heavy material and the interior of the casing immediately above flange 16 and the exterior of the stator are machined as by grinding to provide a friction fit therebetween. Motor casing 11 is preferably provided with a hole 20 in the bottom thereof for ventilation.

Annular wall 14 defines an oil reservoir or chamber 18, the oil supply thereto being fed through a conduit 19 and connection 21 from a conventional storage tank through a suitable oil metering device and constant level valve, not shown. The oil from passage 19 flows into a chamber 22 of slightly larger diameter than aperture 15. Aperture 15 is sealed by the bottom end of a hollow upright bearing member 23, preferably formed of bronze. Bearing member 23 is formed with a flange 24 arranged to engage a shoulder 25 formed immediately above chamber 22. Bearing member 23 is also formed with one or more arcuate notches 26 which permit the passage of oil from chamber 22 to oil chamber 18.

In a preferred embodiment, the wall 14 of oil chamber 18 is preferably one and one-half inches high, the oil level therein being maintained at less than one-quarter of an inch. This insures that oil can never run over wall 14 into the surrounding chamber containing the stator of the driving motor. It also insures a minimum of oil in contact with the feeding mechanism so that there is little or no turbulence and surging is eliminated.

Bearing member 23 has a hollow portion 27 of substantially uniform diameter, and a second hollow portion 28 of larger diameter which is threaded to receive a plug 29 provided with a sealing washer 31 to seal the bottom of aperture 15 and to hold bearing member 23 in position. Plug 29 is bored at 32 to receive a spring 33 arranged to resiliently support a bearing member 34 in line with the hollow portion 27 of the bearing member 23. Bearing member 34 is preferably lubricated by the fuel oil entering reservoir 18 from conduit 19 by means of a passage 30 formed in bearing member 23.

On its outer surface and adjacent its upper end, motor casing 11 is provided with a recessed portion 36 defined by shoulders 36 and 37, a series of apertures 38 being provided around the motor casing within the recessed portion to permit the access of air to the burner. The amount of air admitted through apertures 38 is conveniently regulated by a metal band 39 provided with apertures corresponding in size and shape with apertures 38, the degree of opening of apertures 38 being conveniently controlled by rotating band 39 about the motor casing to different positions. Band 39 is preferably secured in position by a clamping bolt 41 in apertures formed in lugs 42 formed by bending the adjacent ends of band 39 outwardly.

Motor casing 11 is preferably supported in the assembly by brackets 43 (Figure 1) which are apertured to receive threaded rods 44 supported at their upper ends through apertures 45 in a burner collar 46, a nut 47 being provided at the upper end of each rod 44 and a wing nut 48 at the lower end thereof. Nuts 47 are preferably welded to collar 46. Between the underside of burner collar 46 and the upper end of motor casing 11, a plurality of shims 49, preferably of heat insulating material, are provided to facilitate adjustment of the motor casing and the rotor therein contained, and to be hereinafter described, with respect to the hearth.

As will be seen, with the use of a different number of shims 49 and the use of shims of different thicknesses, the position of the motor casing with respect to the burner collar and the hearth may be readily adjusted. To insure the proper alignment of shims 49 and motor casing 11 with respect to burner collar 46, three guide members 51 are preferably provided on the interior of the aperture in burner collar 46 on a vertical flange 52, extending inwardly towards the axis of the motor casing to guide the shims and motor casing into their position with respect to the burner collar.

At its lower portion, burner collar 46 is formed with a horizontal flange 53 secured to a burner collar support 54, preferably by welding, the joint being reinforced by brackets 55, preferably spotwelded to burner collar 46 and burner collar support 54.

Burner collar support 54 is preferably shaped as a half of a hollow cylinder, the wall thereof extending to and secured to a base 66. Base 66 is supported on floor E of the furnace by bolt and nut assemblies 56 preferably located at the spaced points for convenient leveling of the unit.

The rear portion of base 66 is provided with a positioning lug 57 adapted to contact the rear wall of a transformer generally shown at 58, the front portion of the transformer being provided with a plate 59 having an aperture therein adapted to register with a threaded aperture formed on a lug 61 secured to the bottom of base 60. The position of transformer 58 is thus fixed with respect to base 60 by thumb screw 62 which also serves as a connection for a lead 63 from the igniter mechanism. Transformer 58 is also provided with suitable means shown at 64 for a second connection to a second lead 65 to the igniter mechanism, leads 63 and 65 going to the secondary of the transformer. Connection to the primary of the transformer is made at 58a.

While it will be noted that base 60 and wall 54 are relatively light in character and inexpensive to manufacture, there is no undue vibration of the unit in operation because of the inertia imparted to the assembly by mounting transformer 58 on base 60. Moreover, this position of the transformer shields it from the heat radiated from the hearth and enables it to be cooled by the air passing to the burner.

Referring back to burner collar 46, the upper flange 52 of this collar is preferably so located as to be on the same level with the hearth shown at 71, the hearth being formed of suitable refractory material molded on a hearth plate 72 of a shape conforming generally to the interior of the combustion chamber, the hearth plate being supported on flange 53 of burner collar 46 and a flange or spaced lugs 73 on the interior of the combustion chamber C.

Adjacent the outer perimeter of the hearth, a chromium steel flame rim 74 is provided with flame ring grills 75 and an igniter mechanism shown generally at 76. Since this structure forms no part of the present invention, and is described in detail in application Serial No. 227,556, filed on August 30, 1938, no further description thereof need be made in this case.

To insure that the air passing to the burner passes over the transformer and the motor, an air shield 77 (Figure 3), preferably of a shape to complete the enclosure of motor casing 11, and extending to a point immediately above the top of transformer 58, is provided, the air shield being formed with projecting studs 78 arranged to enter slots 79 in the burner collar support 54. Wing nuts are preferably provided to engage studs 78 and secure shield 77 in position. Shield 77 is slotted where necessary as at 81 to permit passage of the fuel connection and the electric leads to motor casing 11.

Referring to Figure 2, the rotor of the fuel distributor and lifting unit generally shown at 12 in its preferred form includes a fan 91 comprising a ribbed disc 92 with a central boss 93 bored as at 94 and provided with a set screw 95, fan blades 96 being provided about the periphery of the disc. Guides 97 are also provided on the under side of disc 92 to receive the upper end of oil distributor tubes 98 and hold them in fixed relation to disc 92. Fan 91 is secured for rotation upon the upper end of a shaft 99 by set screw 95, the shaft extending downwardly through hollow bearing member 23, the lower end of the shaft being provided with anti-friction bearing 101 adapted to rest upon the resiliently supported thrust bearing 34. Bearing 101 is preferably formed by a ball in a recess in the end of shaft 99, the edges of the recess being peened in to prevent escape of the ball.

A distributor head 102 is fixed to shaft 99 at a point immediately below fan 91. Head 102 is formed with a flange 103 provided with apertures to receive the lower ends of oil distributor tubes 98. Flange 103 at its outermost periphery is grooved as at 104 to receive the larger end of a hollow frusto conical member 105, the upper end of member 105 being crimped around the lower end of head 102 into groove 104.

Conical member 105 is tapered as it extends downwardly toward bearing member 23 and terminates at a point immediately above the bottom of oil chamber 18. By reason of its conical formation, and its extension into the oil maintained in the bottom of oil chamber 18, when rotor 12 is rotated, oil will be lifted upon the interior surface of member 105 by reason of centrifugal force and be delivered out of the distributor tubes 98 and against flame rim 74, the necessary quantity of air for combustion being delivered at the same time by fan 91. The cone shape of the feed has been found to be particularly advantageous in that it aids in the elimination of surging difficulties.

If any tendency is exhibited for the oil to climb upwardly upon the outer periphery of conical member 105, a rib or flange 106 is provided within oil chamber 18 which intercepts such oil and slings it against the adjacent wall 14 of the oil chamber. Since wall 14 is stationary, the oil slung against this wall will have no further tendency to climb and will flow back into the oil chamber. This arrangement insures against the passage of any oil over the wall 14 to the part of the chamber housing the stator of the motor.

Some distance from head 102, conical member 105 is provided with a flange 107 to which is secured in depending relation the rotor element of the electrical motor for driving the mechanism as shown at 108, the attachment being preferably made as by screws 109. Rotor 108 and stator 17 preferably form a motor of the shaded pole type, this motor having been found the most efficient in a unit of this type. For instance, in an exemplary installation, it has been found possible to use a motor of relatively low H. P. with a full load speed of 1600 R. P. M.

The arrangement as shown in the present invention is particularly characterized by its ease of installation. In installing the burner shown, shield 77, transformer 58 and motor casing 11 are first removed from supports 54 and 55. A cardboard disc 111 is preferably placed in position in the top of burner collar 46 to prevent the passage of dirt and foreign material into the interior of the unit. The members comprising the support are then placed in the interior of the furnace, hearth pan 72 placed in position and the hearth material applied, the latter being brought up to the level of flange 52.

Before inserting the supporting unit in the furnace, the rear leveling leg 56 is first adjusted and locked at a position such that flange 53 of burner collar 46 on which hearth pan 72 rests will be the same height as support 73 for the outer edge of the hearth pan. This insures leveling of the hearth pan when installed. The unit is then inserted through the fire door of the furnace and leveled by means of the two front leveling screws 56.

The hearth, flame ring and igniter mechanism may be then installed. Cardboard cover 111 is then removed from the burner collar 46 and motor casing 11 is installed by guiding it into position by guides 51 and securing it by brackets 43 and nuts 48. Transformer 58 is secured in place by nut 62 and the connections made thereto. The rotor unit 12 is then introduced through the central hearth opening and placed in position in motor casing 11. Attachment of the fan to the rotor unit is facilitated by reason of guides 97 formed on the under surface of fan 91 which receive the upper ends of oil distributor tubes 98. The connection of the oil line and electrical leads are made and motor shield 77 installed. This completes the assembly of the burner.

It will be noted that the construction of the burner is such that all parts thereof are readily accessible for repair or replacement. Rotor assembly 12 can be removed by simply lifting it out of the motor casing. Likewise, motor casing 11 may be removed by unfastening the screws secured to brackets 43. Transformer 56 can also be readily removed by removing the single screw 62.

The burner of the present invention possesses a number of advantages in operation in addition to those encountered in installation. It has proven extremely dependable and long lived in that the human element in providing lubrication for the burner is entirely removed. Lubrication of the burner is entirely automatic by the fuel flowing through the burner which has access to all the bearings of the rotor. By reason of air shield 77 and the shape of support 54, the air admitted for combustion is directed over the surfaces of the motor and the transformer to keep them at their normal operating temperatures and to insure their protection against heat radiated into the ashpit of the boiler or furnace.

In its operation, the rotor rides on thrust bearing 34 with substantially no load on upright bronze bearing 23. This is because the rotor operates as a top and is dynamically balanced so that centrifugal force alone holds it in its proper position at normal operating speeds. Thus, upright bearing 23 functions only during the brief starting and stopping periods. All bearings are readily accessible for replacement.

It will also be noted that the air intake openings are relatively large for such a small burner. This is a marked advantage in that dust and dirt can not collect and clog the holes and restrict the air admitted to the burner as is the case with small openings that have been considered necessary heretofore in connection with units of small capacity.

Figure 4 is an exploded view of a modified form of construction wherein the cost of the motor unit and casing is materially reduced and servicing thereof is facilitated. Better ventilation of the motor and less vibration thereof is also secured.

A motor casing 121 of relatively light and thin metal is preferably formed by stamping, although it may be formed by die casting or a like operation, the casing being formed with lugs 122 corresponding to lugs 43 of the casing of Figure 1 for suspending the casing from the hearth of the burner. Casing 121 is formed with apertures 123 corresponding to apertures 38 of Figure 1 and a similar air regulating collar 39 is preferably provided. Casing 121 differs from the casing of Figure 2 in that the air regulating collar is guided by an upper flange 124, encircling the top of the motor casing and preferably secured thereto as by spot welding or in the case of die casting—cast to provide desired reinforcement, and a series of spaced lugs 125 (also die cast if a casting is employed) just below apertures 123. Lugs 125 are preferably the same distance below the aperture as shoulder 124 is above. It is to be understood that an annular recess, as formed in the casing of Figure 2, may also be formed by stamping or casting of casing 121. An additional aperture is provided at 126 for the leads to the motor mounted in the casing.

The bottom of casing 121 is dished in shape and provided with a central aperture 128 surrounded by a flat section 129 with bolt holes 131 therein.

Aperture 128 is of a size to receive a conical shaped bearing support 132 having an annular flange 133 formed thereon. In assembled relation, the lower portion of support 132 extends through aperture 128 of casing 121 and flange 133 rests on section 129. Flange 133 is provided with tapped apertures 134 located to receive bolts 135 passing through apertures 131 and may be formed integral with support 132 or formed as a separate part and frictionally or otherwise fitted and secured thereto. This arrangement is particularly advantageous in servicing the unit as will be hereinafter explained.

While it is not essential in normal operation, it may be desirable in some installations to provide a washer 138 of rubber or similar resilient material between flange 133 and section 129 of casing 121 to further eliminate vibration.

Support 132 is provided with an aperture 136 at its lower end and a bore 137 of slightly larger diameter immediately above aperture 136. A bore 138 of still larger size is provided above bore 137 to form a shoulder 139 arranged to receive flange 24 of a bearing 23 corresponding to bearing member 23 of Figure 2. Since bearing member 23 and its elements are the same as shown in Figure 2, like reference characters have been applied thereto to avoid repetition of description.

Support 132 is formed with a series of shoulders or flanges 141 and 142 immediately above flange 133. A collar 143 which with support 132 defines an oil reservoir 144, is preferably press fitted upon flange 142. However, support 132 and collar 143 may be cast integral. Fuel oil is supplied to reservoir 144 by fuel inlet 127 similar to inlet 19 of Figure 2.

A stator 145 preferably of the same general construction as stator 17 of Figure 2 is provided with a lower flange plate 146 secured to the stator as by screws 147. A series of depending lugs 148 are formed on plate 146 and each lug is bent inwardly at its lower end as shown in Figure 4 to provide a horizontal section 149 with a tapped hole 151 to receive a threaded bolt.

In assembling the unit, bearing member 23 with collar 143 is inserted in the central opening of the stator and bolts passed through suitable holes in flange 133 into tapped holes 151 of lugs 148. The holes in flange 133 for receiving the stator bolts are preferably countersunk to prevent interference with the engagement of flange 133 and section 129 of casing 121. The assembly is completed by the insertion of the lower end of support 132 through hole 128 in casing 121 and the insertion of bolts 135.

This modification is of particular value in that the cost thereof is materially reduced by the fact that the motor casing can be either stamped or die cast and can be made of relatively light and thin metal. Furthermore, the dimensions thereof need only be fractional and the support 132 and the stator supports can also be die cast or roughly machined. Since stator 145 is of considerably less diameter than the inside diameter of casing 121 and an annular air space is provided therebetween when assembled, the outside diameter of the stator need not be machined as is the case where a press fit is secured as in the modification shown in Figure 2.

By reason of the engagement of lugs 148 with flange 133 when support 132 and stator 145 are assembled, the proper location of the stator and assembly with respect to the remainder of the assembly is insured. In assembling the unit, because of the guiding character of flange 133 and the securing of both the motor casing and the stator thereto in predetermined relation, correct positioning of all the parts is insured with minimum trouble.

It will be noted that when the unit is assembled, the only contact between the motor and the casing is through the bearing support flange 133. This construction has been found to minimize vibration since the stator is entirely free of the walls of the motor casing. Since the casing is preferably of light and thin metal, it provides a flexible connection between the hearth and the motor which absorbs vibration of the motor unit to a considerable degree. This free suspension or "floating" relation may be even better improved in abnormal installations by the use of washer 130 of flexible material. Moreover, by reason of the clearance between the exterior of the stator and the inside of the motor casing, circulation of the air around the stator is increased with a consequent maintenance of the motor at a lower and more efficient temperature.

This assembly is characterized by its ease in servicing. For instance, if the unit should become unserviceable, the only steps necessary to replace the stator or the bearing support is to disconnect the leads and the oil feed line and remove the bolts 135 holding flange 133 to motor casing 121. This enables support 132 and stator 145 to be lifted as a unit from the assembly. If it is found that the stator requires replacement, this can readily be done by removing the screws holding the stator to support 132 and substituting a new stator therefor. The unit is readily assembled by proceeding in reverse order.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fuel lifting and distributing head, comprising a cup-like casing including a motor element disposed in said casing, a distributor head arranged to be inserted into said casing, said distributor head including an armature arranged to cooperate with said motor element and drive said distributor head when energized, an oil chamber in said casing, a conical member on said distributor head arranged to project into the oil in said chamber and lift the oil upwardly through centrifugal force, an annular, substantially radially outwardly projecting wall on the exterior of said conical member intermediate the ends thereof to intercept oil lifted upon the exterior thereof, and a stationary member immediately adjacent said annular wall extending above and below the level thereof and spaced outwardly therefrom to receive the intercepted oil and permit it to return by gravity to said oil chamber.

2. In an oil lifting and projecting device, a rotor assembly comprising a shaft, a hollow oil distributing head secured to said shaft intermediate its ends, a disc carrying fan-blades secured to said shaft adjacent one end, a plurality of tubes each opening into said head at one end and having its other end disposed beneath said disk to discharge oil radially of said rotor between certain of said fan-blades, a frusto-conical sleeve of substantially uniform internal and external taper from top to bottom having its wide end attached to said head and its narrow end surrounding said shaft in spaced relation thereto adjacent the other end thereof, an armature secured to said sleeve for rotation therewith, said armature being of sleeve-like form and arranged to surround said frusto-conical sleeve in concentric relation thereto, whereby said sleeve and said armature are arranged in nested relation, and means for supplying oil to the narrow end of said frustro-conical sleeve.

3. A fuel lifting and projecting assembly comprising a casing of sheet metal having a substantial degree of flexibility, a rotor support secured to the lower end of said casing and substantially contrally thereof, a stator in said casing, a rotor on said rotor support having an armature cooperating with said stator, and means on said rotor support to support said stator in a position free of contact with said casing whereby said casing functions to provide a flexible and floating suspension for the rotor and stator assembly and minimizes the transmission of vibrations, and an oil lifting and projecting rotor journalled on said rotor support.

4. A fuel lifting and projecting assembly comprising a casing, an upright hollow bearing member in said casing, an oil chamber in said casing surrounding said bearing member, a rotor having a shaft supported in said bearing member for support of said rotor, a distributor head on said shaft, means on said head to distribute oil, means to feed oil to said distributor head comprising a hollow frusto-conical member with its larger end secured to said head and its smaller end projecting into said oil chamber whereby on rotation of said head, oil is lifted from said oil chamber to said distributor head by centrifugal force, and means to feed oil into the bottom of said oil chamber comprising an oil inlet adjacent the bottom of said oil chamber and positioned to discharge oil at a point adjacent said bearing member, the latter being formed with an arcuate axially directed slot in its surface extending from a point adjacent said inlet to a point adjacent the bottom of said chamber and the lower end of said frusto-conical member.

5. A fuel lifting and propecting assembly comprising a casing, an upright hollow bearing member in said casing, an oil chamber in said casing surrounding said bearing member, said casing having a recess immediately surrounding the lower end of said bearing member and below the bottom of said oil chamber, a rotor having a shaft supported in said bearing member for support of said rotor, a distributor head on said shaft, means on said head to distribute oil, means to feed oil to said distributor head comprising a hollow frusto-conical member with its larger end secured to said head and its smaller end projecting into said oil chamber whereby on rotation of said head, oil is lifted from said oil chamber to said distributor head by centrifugal force, and means to feed oil into said casing recess comprising an oil inlet positioned to discharge oil into said recess at a point adjacent said bearing member, the latter being formed with a plurality of arcuate axially-directed slots in its surface extending from said casing recess into said oil chamber at a point above the lower end of said frusto-conical member.

6. In a unitary oil lifting and projecting device, comprising a casing having an open top, said casing having an aperture in the bottom thereof, a unitary oil chamber and rotor support, having a shank portion fitting into the aperture in the bottom of said casing, said support also having a radially extending flange intermediate its length fitting against the bottom of said casing, means for securing said flange to the bottom of said casing, a fuel lifting and projecting rotor journalled on said rotor support, and means for operating said rotor.

7. In a unitary fuel lifting and projecting device, a vertical casing having an open top, said casing having an aperture in the bottom thereof, a unitary oil chamber and rotor support, having a shank portion extending into the aperture in the bottom of said casing and a flange seating against the bottom of said casing, a unitary stator assembly having a flange substantially co-extensive with, and seating upon the flange of said oil chamber and rotor support, and common means for securing said oil chamber and rotor support and stator assembly to the bottom of said casing, and a fuel lifting and projecting rotor journalled on said rotor support, and having an armature cooperating with said stator assembly.

8. A casing; a distributor rotatably supported by said casing; said distributor comprising an oil distributing head and a plurality of oil tubes connected to said head and operable to discharge oil; a shaft supporting said head; a fan carried by said shaft and operable to discharge air concurrently with the discharge of liquid fuel from said tubes, said fan comprising a body member located above said oil tubes carrying downwardly directed fan blades; and a plurality of guides secured to said body member receiving and securing said oil tubes in fixed angular relationship with respect to the blades of said fan.

9. In a unitary fuel lifting and projecting assembly, an upwardly facing oil reservoir; a hollow frustro-conical feed member mounted for rotation about a substantially vertical axis and projecting at its lower end into said reservoir, said reservoir being of enlarged diameter adjacent the lower end of said feed member and having an upwardly facing annular wall disposed closely adjacent the latter; the inner edge of said annular wall being of larger diameter than the lower end of said feed member, said wall lying in a horizontal plane disposed in close proximity to the lower edge of said feed member; and means for supplying oil to said reservoir.

FRANK O. COLE.